United States Patent [19]

Kalnin et al.

[11] Patent Number: 4,634,546

[45] Date of Patent: Jan. 6, 1987

[54] PROCESS FOR THE INTERCALATION OF GRAPHITIC CARBON EMPLOYING FULLY HALOGENATED HYDROCARBONS

[75] Inventors: Ilmar L. Kalnin, Millington; Harris A. Goldberg, Colonia; George J. Breckenridge, Jr., Clark, all of N.J.

[73] Assignee: Celanese Corporation, New York, N.Y.

[21] Appl. No.: 756,528

[22] Filed: Jul. 19, 1985

[51] Int. Cl.$^4$ .............................................. H01B 1/04
[52] U.S. Cl. .................................... 252/506; 252/507; 252/510; 252/502; 423/449; 423/450; 423/454; 423/458; 556/465; 556/478
[58] Field of Search ............... 252/507, 506, 510, 502; 423/450, 447.1, 447.2, 449, 454, 458, 561, 445; 556/43, 52, 71, 465, 478; 568/13; 428/374, 902

[56] References Cited

U.S. PATENT DOCUMENTS

| | | | |
|---|---|---|---|
| 4,382,882 | 5/1983 | Vogel et al. | 252/506 |
| 4,461,719 | 7/1984 | Vogel et al. | 423/445 |
| 4,477,374 | 10/1984 | Watanabe et al. | 252/506 |
| 4,511,493 | 4/1985 | Watanabe et al. | 252/506 |
| 4,515,709 | 5/1985 | Watanabe et al. | 252/506 |

Primary Examiner—Josephine L. Barr
Attorney, Agent, or Firm—Burns, Doane, Swecker & Mathis

[57] ABSTRACT

An improved procedure is provided for increasing the electrical conductivity of graphite via intercalation. It has been found that fully halogenated hydrocarbons (as described) have the ability to substantially aid the intercalation of graphite by previously known intercalant mixtures of (a) fluorosulfonic acid, chlorosulfonic acid, or mixtures thereof, and (b) a boron trihalide, a tetrahalide of a Group IV element, a pentahalide of a Group V element, or mixtures thereof. The presence of a fully halogenated hydrocarbon, such as carbon tetrachloride, during the graphite intercalation reaction has been found to expedite the rate at which intercalation takes place and possibly enables the achievement of a greater electrical conductivity than would have otherwise been obtained. In a preferred embodiment the graphite carbon is present within a carbonaceous fibrous material at the time of its intercalation and the resulting product is substantially electrically oriented along the axis of the fiber.

28 Claims, No Drawings

PROCESS FOR THE INTERCALATION OF GRAPHITIC CARBON EMPLOYING FULLY HALOGENATED HYDROCARBONS

BACKGROUND OF THE INVENTION

It has long been known that the unique crystalline structure of graphite makes it anisotropic with respect to conducting electrons. Its structure basically comprises planes of aromatically bound carbon atoms. Hence, each of such planes has $\pi$ clouds of electrons above and below it. These electron clouds have been said to contribute to its anisotropic conductive behavior, the conductivity being in a direction parallel to the aromatic carbon planes. This conductivity is approximately 5 percent that of copper.

It also has been known that certain elements or molecules, when diffused into the graphite lattice, assume positions interstitial to the aromatic planes and improve graphite conductivity. Ubbeholde, for example, found that the interstitial compound formed between graphite and nitric acid has a conductivity almost equal to that of copper (which is $0.6 \times 10^6$ ohms$^{-1}$ cm.$^{-1}$) when measured parallel to the aromatic planes [A. R. Ubbeholde, Proc. Roy. Soc., A304, 25, (1968)].

U.S. Pat. No. 3,409,563 describes conductive graphite structures formulated from vermicular graphite and an agent such as $Br_2$, $FeCl_3$, $CrO_2Cl_2$, $SO_3$, $SbCl_5$, $CrCl_3$, $ICl$, $CrO_3$, $AuCl_3$, $InCl_3$, $PtCl_4$, $CrO_2F_2$, $TaCl_5$, $SmCl_3$, $ZrCl_4$, $UCl_4$, and $YCl_3$. The treated vermicular graphite is then compressed into structures.

U.S. Pat. No. 3,984,351 discloses the intercalation of graphite with a Lewis Acid in the presence of chlorine to form a catalyst.

German Pat. No. 2,537,272 discloses the formation of an electrically conductive graphite intercalation compound employing a strong acid halide system wherein graphite is reacted with "the proton donor (Bronsted acid), hydrogen fluoride, and an electron acceptor (Lewis acid) such as boron trihalide, a tetra halide from a Group IV metal, or a pentahalide from a Group V metal."

It also is known that $SbF_3Cl_2$ is an effective intercalant for graphite. See, for instance, Zeitschrift der Anorganischen und Allgemeinen Chemie, Vol. 384, pages 169 to 176 (1971) by A. Boeck and W. Rudorff.

In U.S. Pat. No. 4,293,450 is disclosed the intercalation of graphite with (a) fluorosulfonic acid, chlorosulfonic acid, or mixtures thereof, and (b) a boron trihalide, a tetrahalide of a Group IV element, a pentahalide of a Group V element, or mixtures thereof. This disclosure is silent concerning how the desired intercalation could be aided through the presence of another reactant such as that claimed herein.

In U.S. Pat. No. 4,388,227 and U.S. Ser. No. 445,758, filed Nov. 30, 1982, is described as an improved carbonaceous fibrous material comprising graphitic carbon which has been found to be particularly suited for intercalation.

It is an object of the present invention to provide an improved process for forming an intercalated electrically conducting composition.

It is another object of the present invention to provide an improved process whereby graphite is intercalcated at an increased rate and possibly a greater electrical conductivity is achieved in the final intercalated product.

It is another object of the present invention to form an intercalated graphite product of maximum conductance within a minimum amount of time.

It is a further object of the present invention to provide an improved process for the intercalation of graphite which can be carried out on a relatively economical basis with the need to employ only small amounts of the relatively expensive halide intercalant (b).

These and other objects, as well as the scope, nature and utilization of the claimed invention will be apparent to those skilled in the art from the following detailed description and appended claims.

SUMMARY OF THE INVENTION

It has been found in a process for forming an intercalated electrically conducting composition comprising reacting graphite in a reaction zone under anhydrous conditions with:

(a) a sulfur-containing reactant selected from the group consisting of fluorosulfonic acid, chlorosulfonic acid, and mixtures thereof, and (b) a halide reactant selected from the group consisting of boron trihalide, a tetrahalide of a Group IV element, a pentahalide of a Group V element, and mixtures thereof;

that improved results are achieved by additionally providing in the reaction zone during at least a portion of the reaction a fully halogenated hydrocarbon having 1 to 4 carbon atoms which is capable of aiding the increase in the electrical conductivity of the graphite.

In a preferred embodiment an improved process is provided for forming an intercalated electrically conducting fiber which is electrically oriented along its axis comprising reacting in an reaction zone under anhydrous conditions a carbonaceous fibrous material comprising graphitic carbon with the following reactants:

(a) a sulfur-containing reactant selected from the group consisting of fluorosulfonic acid, chlorosulfonic acid, and mixtures thereof, (b) a halide reactant selected from the group consisting of boron trihalide, a tetrahalide of a Group IV element, a pentahalide of a Group V element, and mixtures thereof, and (c) a fully halogenated hydrocarbon having 1 to 4 carbon atoms, wherein the fully halogenated hydrocarbon is capable of substantially aiding the increase in the electrical conductivity of the carbonaceous fibrous material comprising graphitic carbon.

DESCRIPTION OF THE PREFERRED EMBODIMENTS

The graphite which is intercalated in accordance with the present invention may be provided in a variety of physical configurations at the time of intercalation. For instance, the graphite may be initially provided in the form of large crystals, crystalline powder, bulk or sintered graphite, carbonaceous fibrous materials (i.e., carbon fibers) which include graphitic carbon, etc. It is a general rule that the more perfect the graphite starting material is, the better the conductivity of the resultant graphite intercalation compound. Hence, it is preferable to employ graphite of relatively high purity and which has a high degree of crystallinity. However, graphite of lower degrees of purity and crystallinity can be selected. The structure of high modulus carbon filaments is such that the normal to the "c" axis of the graphite crystals present therein lies parallel to the filament axis and there is an axis of rotational symmetry about this normal. The graphite starting material can be conveniently formed by known techniques prior to the intercalation reaction described hereafter. In a particularly preferred embodiment the carbonaceous fibrous material is formed in accordance with the teachings of U.S. Pat. No. 4,388,227 which is herein incorporated by reference. There the carbonaceous fibrous material is derived from either an acrylonitrile homopolymer or a closely related copolymer and undergoes processing at an unusually high temperature. However, in less preferred embodiments, the carbonaceous fibrous material may be derived from other acrylic fibrous materials, cellulosic fibers, pitch fibers, polybenzimidazole fibers, etc.

The first component of the reactant mixture for use in forming an intercalated electrically conducting composition in accordance with the present invention is a sulfur-containing reactant selected from fluorosulfonic acid, chlorosulfonic acid, and mixtures of the same. This reactant must be anhydrous. Fluorosulfonic acid possesses the formula $HSO_3F$ and is a colorless fuming liquid having a boiling point of approximately 165° C. This fluorosulfonic acid reactant sometimes is designated "fluorosulfuric acid" or "fluorosulfonic acid" in the literature. Chlorosulfonic acid possesses the formula $HSO_3Cl$ and is a colorless to light yellow liquid having a boiling point of approximately 158° C. The chlorosulfonic acid reactant sometimes is designated sulfuric chlorohydrin. The customary care should be taken in the handling of these highly toxic materials.

The second component of the reactant mixture for use in forming an intercalated electrically conducting composition in accordance with the present invention is a halide reactant selected from the group consisting of a boron trihalide, a tetrahalide of a Group IV element (e.g., of a Group IV metal), a pentahalide of a Group V element (e.g., of a Group V metal), and mixtures thereof. This reactant must be anhydrous. The preferred halides for use in the present process are the fluorides. The Group IV elements may be under either of headings IVA or IVB of the periodic table published at Page 662 of "The Condensed Chemical Dictionary", Ninth Edition, Van Nostrand Reinhold (1977). Preferred Group IV element tetrahalides are $SiF_4$ (i.e., silicon tetrafluoride), $HfF_4$ (i.e., hafnium tetrafluoride), $TiF_4$ (i.e. titanium tetrafluoride), and $ZrF_4$ (i.e., zirconium tetrafluoride). The Group V elements may be under either of headings VA or VB of the periodic table published at Page 662 of "The Condensed Chemical Dictionary", Ninth Edition, Van Nostrand Reinhold (1977). Preferred Group V element pentafluorides are $PF_5$ (i.e., phosphorus pentafluoride), $NbF_5$ (i.e., niobium pentafluoride), $TaF_5$ (i.e. tantalum pentafluoride), $AsF_5$ (i.e., arsenic pentafluoride), and $SbF_5$ (i.e., antimony pentafluoride). The particularly preferred halide reactant for use in the present invention in $SbF_5$. The usual care should be taken in the handling of the toxic halide reactant.

In accordance with the concept of the present invention it surprisingly has been found that the presence of a fully halogenated hydrocarbon having 1 to 4 carbon atoms in the reaction zone during at least a portion of the intercalation reaction will significantly aid the intercalation. The fully halogenated hydrocarbon may be saturated or unsaturated, and in all instances is free of hydrogen atoms which are bound to the carbon atoms. The fully halogenated hydrocarbon preferably is a liquid at the temperature at which the intercalation reaction is conducted. In a preferred embodiment the fully halogenated hydrocarbon is saturated and is of the formula $C_nX_{2n+2}$ where n is a whole number of 1 to 4 (most preferably 1 or 2) and X is F, Cl, Br, or mixtures of F, Cl, and Br (i.e, two or three of these). The fully halogenated hydrocarbon should be anhydrous. Representative fully halogenated hydrocarbons for use in the present invention include carbon tetrachloride, fluorotrichloromethane, dichlorodifluoromethane, bromotrichloromethane, dibromochlorofluoromethane, 1,1,2-trichlorotrifluoroethane, tetrachlorodifluoroethane, trichloropentafluoropropane, tetrachlorotetrafluoropropane, octachloro-1,4-difluorobutane, hexachloro-1,3-butadiene, etc., and mixtures of these. The particularly preferred fully halogenated hydrocarbon for use in the present invention is carbon tetrachloride for reasons of cost and convenience. The presence of the fully halogenated hydrocarbon has been found to greatly accelerate the intercalation reaction and may also lead to higher levels of conductivity than would otherwise have been possible.

In a preferred embodiment the sulfur-containing reactant, the halide reactant, and the fully halogenated hydrocarbon are provided in the reaction zone in molar ratios of approximately 1:0.1:100 to 100:20:100, and most preferably from 10:1:100 to 50:10:100 (e.g., 20:1:100). The fully halogenated hydrocarbon can be provided in the reaction zone at the beginning of the intercalation reaction or it may be added in one or more increments during the course of the intercalation reaction. For best results it is recommended that the halide reactant and the fully halogenated hydrocarbon not be in contact with each other for more than about 30 minutes prior to contact with the graphite. In a preferred embodiment the halide reactant and the fully halogenated hydrocarbon are not in contact with each other for more than about 15 minutes prior to contact with the graphite. Such procedure minimizes the loss of the reactive intercalating species formed by the chemical interaction of these substances when added together. Prior contact between the sulfur-containing reactant and the fully halogenated hydrocarbon for extended periods of time does not appear to diminish intercalation effectiveness.

The graphite and the reactants preferably are provided in the reaction zone during the course of the intercalation reaction at a temperature of approximately 0° to 50° C., and preferably at a temperature of approximately 15° to 35° C.

As will be apparent to those skilled in the art, the desired intercalation of the graphite must be carried out in vessels which are capable of withstanding the reactants. Suitable materials for the reaction vessels include Type 304 stainless steel, Type 316 stainless steel, high nickel alloys (e.g., Monel alloy available from the Huntington Alloy Products Division of the International Nickel, Co., Inc.), polytetrafluoroethylene (e.g., Teflon polymer available from E. I. DuPont de Nemours Co.), other fluorocarbon polymers (e.g., Kel-F polymer available from 3M Company), etc.

In the laboratory it has been found especially practical to combine the intercalating reactants with the graphite under inert conditions in a closed system. Typically, it is preferred to employ an apparatus such as a "dry box". This apparatus permits the materials to be placed separately, in sealed containers, into a closed chamber which is flushed with an inert gas such as dried argon or nitrogen. Access to the chamber is had through gas-tight gloves. Hence, the sealed containers are opened under an inert atmosphere and the desired intercalation reaction can be performed without fear of contamination.

It is essential that anhydrous conditions be maintained during the intercalation of the graphite. The reactants may be in the liquid and/or the gaseous form when contacted with the said graphite. Atmospheric or superatmospheric pressure conditions may be utilized during the intercalation reaction. Regardless of the degree of graphitic carbon perfection, or the reaction conditions selected, the presence of the fully halogenated hydrocarbon will substantially aid the intercalation reaction.

Although there is no definitive theory to explain the benefit derived from adding the fully halogenated hydrocarbon (e.g., carbon tetrachloride) to the intercalants, there are numerous effects which may be operative. On a thermodynamic basis it is expected that the fully halogenated hydrocarbon and the halide reactant (b) will exchange halogen atoms. During this process halogen-containing radicals likely are produced. Such radicals could provide extra oxidizing capability and thus aid the intercalation of the reactant (b) electron accepting molecules (e.g., $SbF_5$). Optically created radicals, for instance, have been shown to enhance the intercalation of metal chlorides dissolved in chlorinated solvents. Other possible ways in which the halogen exchange reaction may accelerate the intercalation include: local heating, changes in viscosity, and changes in the wetting of the graphite surfaces. In addition, the species which is produced may be more easily intercalated than the pure species. Thus, a reaction product of the halide reactant and the fully halogenated hydrocarbon may yield a highly effective intercalant (e.g., $SbF_3Cl_2$ formed by the reaction of antimony pentafluoride and carbon tetrachloride). In the past it has been reported that Lewis acid halides, such as antimony pentafluoride, and halogenated compounds, such as carbon tetrachloride, will interact. See, for instance, "Fluorine Chemistry" Vol. 1, Academic Press, N.Y. (1950), pages 105 to 106, I. H. Simons, Editor. It is not known whether these possible explanations are in fact operative.

Once a carbonaceous fibrous material containing graphitic carbon is intercalated in accordance with the present invention and is thereby rendered highly electrically conductive, it can be incorporated within a metal which is capable of protecting it against breakage and of imparting solderability to the same. Such metal/intercalated graphite composites can be prepared from any of a number of desired metals, and the particular metal employed is restricted solely by the intended application of the composite. Copper is deemed preferable for most applications, but excellent results are obtained from silver, aluminum, and nickel. For instance, if the graphite intercalation compound is present in filament form a metal plating technique can be employed. Hence, intercalated graphite filaments can be made the cathode in a metal plating solution. This process can be carried out batchwise, in which case an electrode is attached to one end of a yarn which is submerged in the plating solution. Alternatively, the composite can be made continuously by passing the filaments while in continuous form over a metal electrode and into the plating bath. Residence times and other reaction conditions are easily determinable by one of reasonable skill in the art, and such reaction parameters are functions of the particular plating bath, cathode current, graphite yarn conductivity, cross-sectional area, etc. Another method of forming metal composites of the intercalated graphite filaments comprises twisting metal strands or wires with the filaments. Hence, it is possible to greatly vary physical and electrical properties of conductors by varying the ratio of metal to graphite strands and by choosing strands of a particularly suitable metal. In such composite articles the intercalated graphite is electrically oriented along the axis of the resulting composite article (i.e., the resulting electrical conductor).

Additionally, powdered particulate intercalated graphite can be formed into a composite article employing a sheath method. In this method, a tube of the appropriate metal, such as $\frac{1}{4}$ inch outer diameter copper tubing, is filled with the intercalated graphite powder and the powder is lightly tamped therein. Excessive packing of the powder hampers electrical orientation of the graphite and is to be avoided. When full, the tube is preferably sealed and subjected to swaging. For instance, a $\frac{1}{4}$ inch outer diameter copper tube, filled with graphite powder, can be swaged down to a diameter of about 40 mils by means of a Torrington Swaging Mill. The resultant metal composite conductor accordingly comprises a 40 mil wire having excellent physical and electrical properties with the intercalation compound being electrically oriented along the axis of the conductor.

Electrical conductors which incorporate the intercalated graphite are lighter in weight than conventional metallic electrical conductors and can be utilized, for instance, to advantage in those applications where reduced weight is of importance. The electrical conductors of the present invention commonly have a configuration of an elongated wire. Other physical configurations are possible however. For instance, conductor strips can be formed for use as bus bars in electrical equipment. Additionally, electrically conductive composite articles can be formed wherein fibers containing the intercalated graphite are incorporated in a matrix material (e.g., an epoxy resin). Such lightweight composite articles are particularly suited for use in aircraft applications.

Because of the low density, in comparison to the metallic conductors, and the high current-carrying capability, the intercalated fiber conductor has great utility in numerous applications. Thus, when fabricated in the form of a fine low denier yarn, it is particularly suitable for use as a fine gauge magnet wire. Alternately, it may be plied, woven or braided to form stranded wire cables or tapes for use as lightweight electroconductors in transportation equipment, such as space vehicles, aircraft, navel vessels, trucks, etc., or in the communications and power transmission industries. Also, these products may be useful as efficient electrode materials in various non-aqueous batteries or as collectors for nonaqueous electroseparation processes.

The electrical conductivity and electrical resistivity of a carbonaceous fibrous material containing graphitic carbon before or after intercalation can be determined by the testing of individual filaments in accordance with a standard four point or four contact measuring technique designed to eliminate unwanted contact resistance. Principles of this method are presented in standard textbooks, such as "Electrical Measurements in Theory and Application", by A. W. Smith, 4th Edition, McGraw Hill Book Co., N.Y. (1948), which is herein incorporated by reference. More specifically, the filaments first are placed upon substrates comprising alumina ceramic plates possessing four spaced platinum strip contacts, and are attached to the strip contacts by baking with conductive gold paste. For convenience the inner voltage contacts are spaced one centimeter apart. A known electrical current is applied to the outer contacts and passes through the filament. The two inner contacts are connected to a high impedance voltmeter (preferably $>10^6$ ohm impedance) and the potential difference is accurately measured. Suitable filament substrates having the four spaced platinum strip contacts are commercially available from Affiliated Manufacturers of North Branch, N.J. A suitable conductive gold paste is No. 4350 gold paste, commercially available from the Cermalloy Co. of West Chonshohocken, Pa. When a d.c. measurement is made, the outer leads can be attached to a variable d.c. power supply such as Hewlett-Packard Model 6218A power supply which is adjusted to provide a constant current in the 10 to 100 micro-ampere range with the current being measured by means of a digital voltmeter (e.g., a Keithley Model 179 Multimeter) across a precision 5K ohm resistor. The potential difference between the inner voltage contacts can be measured directly either by a Keithley Model 179 Multimeter or recorded as a function of time on a Hewlett-Packard Model 7132A chart recorder. Alternatively, substantially identical volume resistivity values can be obtained through a.c. measurements (e.g., 60 Hertz) employing a Keithley Model 503 milliohm meter. Measurements can be carried out continuously during the intercalation. Prior to conducting the measurements the filament samples are initially heated at 80° to 100° C. in a vacuum oven at a pressure of 10 Torr or less for 1 to 1.5 hours to remove any adsorbed moisture and are then transferred to a controlled atmosphere chamber for electrical conductivity measurement and intercalation. The electrical conductivity and electrical resistivity then are calculated in accordance with standard procedures taking into consideration the measured potential difference, the gauge length (i.e., 1 cm.), and the filament cross-sectional area.

The following examples are given as specific illustrations of the formation of preferred graphite intercalation compounds of the present invention. It should be understood, however, that the invention is not limited to the specific details set forth in the examples.

EXAMPLE I

A multifilamentary carbonaceous yarn bundle of 384 continuous filaments comprising graphitic carbon and containing in excess of 99 percent carbon by weight was selected as the starting material. The yarn bundle had an average Young's modulus of approximately 110,000,000 psi, an average tensile strength of approximately 250,000 psi, and a bulk density of approximately 2.12 Kg./dm.$^3$. Such carbonaceous yarn bundle had been derived from an acrylonitrile homopolymer and had been processed at a maximum temperature of approximately 3050° C. during its formation. A 1.5 meter length of the yarn was wound and secured on a specially constructed spool-type fixture designed for continuous four-terminal electrical resistance measurements of the bundle. The details of this configuration are described in detail in Synthetic Metals, Vol. 3, pages 169 to 176 (1981) by H. A. Goldberg and I. L. Kalnin which is herein incorporated by reference. The fixture bearing the carbonaceous fibrous material was placed in a glass beaker containing 12 cm.$^3$ of a freshly prepared binary mixture of fluorosulfonic acid and antimony pentafluoride while present in a steel dry box manufactured by Kewaunee Scientific Engineering Co. filled with dry nitrogen provided at room temperature (i.e., approximately 23° C.). The fluorosulfonic acid and the antimony pentafluoride were provided as a 50—50 weight percent mixture (i.e., in a molar ratio of fluorosulfonic acid:antimony pentafluoride of 2.2:1. The resistance of the multifilamentary yarn bundle dropped from 215 ohms very slowly to 176 ohms over a period of 220 minutes.

Next the fixture with the adhering fluorosulfonic acid and antimony pentafluoride was immediately immersed in a second beaker present in the dry box containing approximately 15 cm.$^3$ of dry certified reagent grade carbon tetrachloride which previously had been dried over type 4A molecular sieves. The estimated mole ratio of fluorosulfonic acid:antimony pentafluoride:carbon tetrachloride in this beaker was 2.2:1:100. The resistance of the yarn bundle was observed to rapidly decrease to 11 ohms in 10 minutes and remained at that value even after taking out of the second beaker containing carbon tetrachloride and reimmersing in the original beaker containing fluorosulfonic acid and antimony pentafluoride. Accordingly, it is seen that the electrical conductivity increased nearly 20 times.

EXAMPLE II

A single filament was removed from the same multifilamentary yarn bundle which served as the starting material in Example I. The physical properties of this filament were assumed to be substantially the same as those of adjacent filaments (i.e., the filament possessed a maximum cross section of approximately 8 microns, had a peanut-shaped cross section, exhibited an average Young's modulus of approximately 110,000,000 psi, an average tensile strength of approximately 250,000 psi, and a bulk density of approximately 2.12 Kg./dm.$^3$. The single filament was mounted in accordance with the standard four point measuring technique heretofore described in the body of this disclosure.

Next, the mounted filament was immersed in a beaker present in the dry box containing 2 grams of fluorosulfonic acid and 15 grams of carbon tetrachloride. It was noted that the contents of the beaker were not completely homogeneous but tended to separate into two layers with a carbon tetrachloride-rich layer on the top and a fluorosulfonic acid-rich layer on the bottom. Chemical analysis later showed that at equilibrium the upper layer contained an about 1 weight percent solution of dissolved fluorosulfonic acid.

When immersed in the top layer the initial resistance of 790 ohms decreased very slowly to 39 ohms in 210 minutes and remained at that level. After a 30-minute wait approximately 0.3 gram of liquid antimony pentafluoride was added into the solution by use of a hypodermic syringe. Accordingly the overall molar ratio of fluorosulfonic acid:antimony pentafluoride:carbon tetrachloride in the solution was approximately 20:1:100. The solution immediately began to bubble, and the filament resistance decreased rapidly to 24 ohms in 10 minutes and remained at that level. It is seen that the electrical conductance increased nearly 33 times.

EXAMPLE III

Example II was substantially repeated with the exceptions indicated.

In this instance approximately 0.3 gram of antimony pentafluoride was initially added to the upper layer present in the beaker, and the mounted filament was placed therein. It was observed that the electrical resistance initially was 908 ohms and decreased to 42 ohms over a period of 160 minutes in spite of the relatively low concentration of antimony pentafluoride. Upon the addition of another 0.3 gram of antimony pentafluoride the resistance dropped to 34 ohms over a period of 30 minutes. This indicates that the interaction between the carbon tetrachloride and the antimony pentafluoride initiates the enhanced intercalation within the intercalant mixture.

EXAMPLE IV

Example II was substantially repeated with the exceptions indicated. 1,1,2-trichlorotrifluoroethane was employed as the halogenated compound instead of carbon tetrachloride. The 1,1,2-trichlorotrifluoroethane was commercially available from DuPont under the Freon FC-113 designation.

In this instance 2 grams of fluorosulfonic acid and 15 grams of 1,1,2-trichlorotrifluoroethane were initially added to the beaker. It was observed that the electrical resistance initially was 806 ohms and decreased slowly to 771 ohms over a period of 210 minutes. At that point 3 grams of antimony pentafluoride were added to the beaker. Accordingly, the molar ratio of fluorosulfonic acid:antimony pentafluoride:1,1,2-trichlorotrifluoroethane was 20:10:100. The resistance quickly dropped to 29 ohms in one minute and remained at that level. It is seen that the electrical conductance increased nearly 28 times.

For comparative purposes when the antimony pentafluoride and the carbon tetrachloride in the absence of fluorosulfonic acid are mixed together, an exothermic reaction begins immediately with the evolution of bubbles. When the antimony pentafluoride is consumed, the gas evolution ceases. Also, there is commonly the formation under these circumstances of a white solid which deposits at the bottom of the vessel. Once the antimony pentafluoride is consumed there is no possibility for the generation of the active intercalant in the solution.

Although the invention has been described with preferred embodiments, it is to be understood that variations and modifications may be employed without departing from the concept of the invention as defined in the following claims.

We claim:

1. In a process for forming an intercalated electrically conducting composition comprising reacting graphite in a reaction zone under anhydrous conditions with:
   (a) sulfur-containing reactant selected from the group consisting of fluorosulfonic acid, chlorosulfonic acid, and mixtures thereof, and
   (b) a halide reactant selected from the group consisting of boron trihalide, a tetrahalide of a Group IV element, a pentahalide of a Group V element, and mixtures thereof;
the improvement of additionally providing in said reaction zone while at a temperature of a approximately 0° to 50° C. during at least a portion of said reaction a fully halogenated hydrocarbon having 1 to 4 carbon atoms which is capable of aiding the increase in the electrical conductivity of the graphite, wherein contact between said halide reactant (b) and said fully halogenated hydrocarbon for more than about 30 minutes prior to contact with said graphite is avoided, and wherein the molar ratios of reactant (a), reactant (b), and the fully halogenated hydrocarbon provided in the reaction zone are approximately 1:0.1:100 to 100:20:100.

2. A process for forming an intercalated electrically conducting composition according to claim 1 wherein said graphite is in the form of a fiber and the resulting intercalated electrically conducting composition is electrically oriented along its axis.

3. An improved process for forming an intercalated electrically conducting composition according to claim 1 wherein said sulfur-containing reactant (a) is fluorosulfonic acid.

4. An improved process for forming an intercalated electrically conducting composition according to claim 1 wherein said halide reactant (b) is a fluoride.

5. An improved process for forming an intercalated electrically conducting composition according to claim 1 wherein said halide reactant (b) is a Group IV element tetrahalide selected from the group consisting of $SiF_4$, $HfF_4$, $TiF_4$ and $ZrF_4$.

6. An improved process for forming an intercalated electrically conducting composition according to claim 1 wherein said halide reactant (b) is a Group V element pentahalide selected from the group consisting of $PF_5$, $NbF_5$, $TaF_5$, $AsF_5$ and $SbF_5$.

7. An improved process for forming an intercalated electrically conducting composition according to claim 1 wherein said halide reactant (b) is antimony pentafluoride.

8. An improved process for forming an intercalated electrically conducting composition according to claim 1 wherein said sulfur-containing reactant (a) is fluorosulfonic acid and said halide reactant (b) is $SbF_5$.

9. An improved process for forming an intercalated electrically conducting composition according to claim 1 wherein said fully halogenated hydrocarbon possesses the formula $C_nX_{2n+2}$ where n is a whole number from 1 to 4 and X is selected from the group consisting of F, Cl, Br, and mixtures thereof.

10. An improved process for forming an intercalated electrically conducting composition according to claim 1 wherein said fully halogenated hydrocarbon is selected from the group consisting of carbon tetrachloride, fluorotrichloromethane, dichlorodifluoromethane, bromotrichloromethane, dibromochlorofluoromethane, 1,1,2-trichlorotrifluoroethane, tetrachlorodifluoroethane, trichloropentafluoropropane, tetrachlorotetrafluoropropane, octachloro-1,4-difluorobutane, hexachloro-1,3-butadiene, and mixtures of the foregoing.

11. An improved process for forming an intercalated electrically conducting composition according to claim 1 wherein said fully halogenated hydrocarbon is carbon tetrachloride.

12. An improved process for forming an intercalated electrically conducting composition according to claim 1 wherein contact between said halide reactant and said fully halogenated hydrocarbon for more than about 15 minutes prefer to contact with said graphite is avoided.

13. An improved process for forming an intercalated electrically conducting composition according to claim 1 wherein the molar ratios of reactant (a), reactant (b), and the fully halogenated hydrocarbon provided in the reaction zone are approximately 10:1:100 to 50:10:100.

14. An improved process for forming an intercalated electrically conducting composition according to claim 1 wherein the contents of said reaction zone are provided at a temperature of approximately 15° to 35° C. during the course of said reaction.

15. An improved process for forming an intercalated electrically conducting fiber which is electrically oriented along its axis comprising reacting in an reaction zone under anhydrous conditions while at a temperature of approximately 0° to 50° C. a carbonaceous fibrous material comprising graphitic carbon with the following reactants:
(a) a sulfur-containing reactant selected from the group consisting of fluorosulfonic acid, chlorosulfonic acid, and mixtures thereof,
(b) a halide reactant selected from the group consisting of boron trihalide, a tetrahalide of a Group IV element, a pentahalide of a Group V element, and mixtures thereof, and
(c) a fully halogenated hydrocarbon having 1 to 4 carbon atoms,
wherein the fully halogenated hydrocarbon is capable of substantially aiding the increase in the electrical conductivity of the carbonaceous fibrous material comprising graphitic carbon, contact between said halide reactant (b) and said fully halogenated hydrocarbon (c) for more than about 30 minutes prior to contact with said graphite is avoided, and the molar ratios of reactants (a), (b) and (c) provided in the reaction zone are approximately 1:0.1:100 to 100:20:100.

16. An improved process for forming an intercalated electrically conducting carbonaceous fibrous material comprising graphitic carbon according to claim 15 wherein said sulfur-containing reactant (a) is fluorosulfonic acid.

17. An improved process for forming an intercalated electrically conducting carbonaceous fibrous material according to claim 15 comprising graphitic carbon wherein said halide reactant (b) is a fluoride.

18. An improved process for forming an intercalated electrically conducting carbonaceous fibrous material according to claim 15 wherein said reactant (b) is a Group IV element tetrahalide selected from the group consisting of $SiF_4$, $HfF_4$, $TiF_4$ and $ZrF_4$.

19. An improved process for forming an intercalated electrically conducting carbonaceous fibrous material according to claim 15 wherein said reactant (b) is a Group V element pentahalide selected from the group consisting of $PF_5$, $NbF_5$, $TaF_5$, $AsF_5$ and $SbF_5$.

20. An improved process for forming an intercalated electrically conducting carbonaceous fibrous material according to claim 15 wherein said reactant (b) is antimony pentafluoride.

21. An improved process for forming an intercalated electrically conducting carbonaceous fibrous material according to claim 15 wherein said sulfur-containing reactant (a) is fluorosulfonic acid and the halide reactant (b) is $SbF_5$.

22. An improved process for forming an intercalated electrically conducting carbonaceous fibrous material according to claim 15 wherein said fully halogenated hydrocarbon possesses the formula $C_nX_{2n+2}$ where n is a whole number from 1 to 4 and X is selected from the group consisting of F, Cl, Br, and mixtures thereof.

23. An improved process for forming an intercalated electrically conducting carbonaceous fibrous material according to claim 15 wherein said fully halogenated hydrocarbon is selected from the group consisting of carbon tetrachloride, fluorotrichloromethane, dichlorodifluoromethane, bromotrichloromethane, dibromochlorofluoromethane, 1,1,2-trichlorotrifluoroethane, tetrachlorodifluoroethane, trichloropentafluoropropane, tetrachlorotetrafluoropropane, octachloro-1,4-difluorobutane, hexachloro-1,3-butadiene, and mixtures of the foregoing.

24. An improved process for forming an intercalated electrically conducting carbonaceous fibrous material according to claim 15 wherein said fully halogenated hydrocarbon is carbon tetrachloride.

25. An improved process for forming an intercalated electrically conducting carbonaceous fibrous material according to claim 15 wherein contact between said halide reactant and said fully halogenated hydrocarbon for more than about 15 minutes prior to contact with said graphite is avoided.

26. An improved process for forming an intercalated electrically conducting carbonaceous fibrous material according to claim 15 wherein the molar ratios of reactants (a), (b) and (c) provided in the reaction zone are approximately 20:1:100.

27. An improved process for forming an intercalated electrically conducting carbonaceous fibrous material according to claim 15 where the molar ratios of reactants (a), (b) and (c) provided in the reaction zone are approximately 10:1:100 to 50:10:100.

28. An improved process for forming an intercalated electrically conducting composition according to claim 15 wherein the contents of said reaction zone are provided at a temperature of approximately 15° to 35° C. during the course of said reaction.

* * * * *